Feb. 9, 1960           W. MARKEL           2,924,246
TOGGLE-OPERATED TEST PLUG FOR PLUMBING UNITS
Filed Feb. 10, 1958
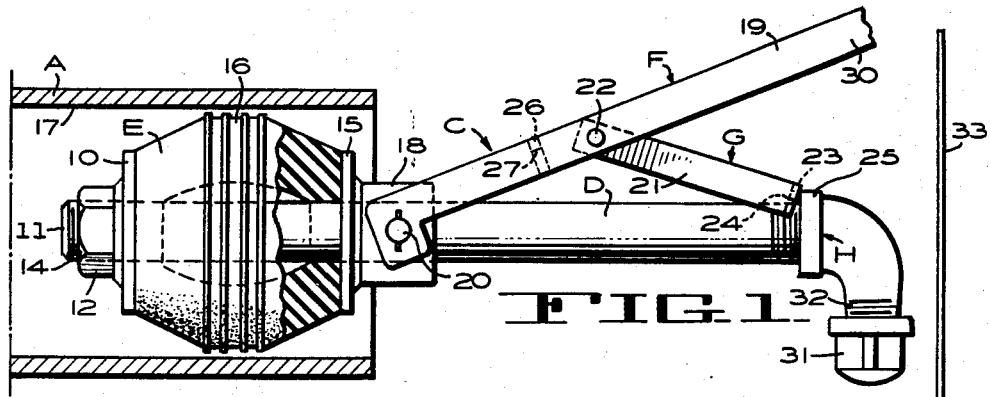
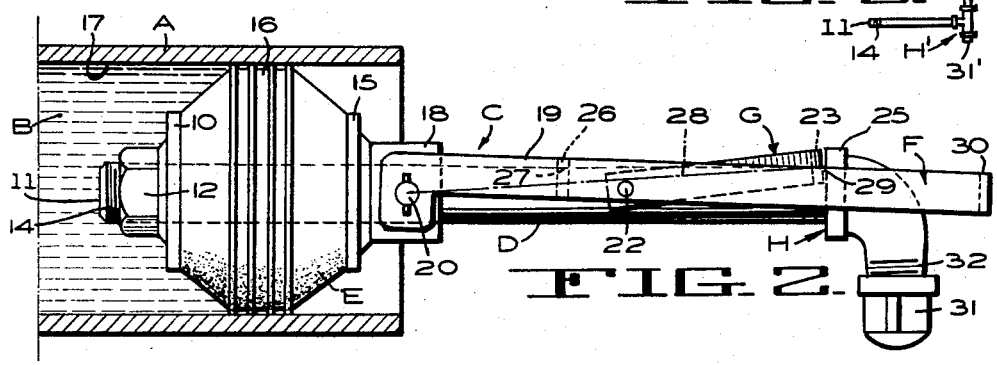
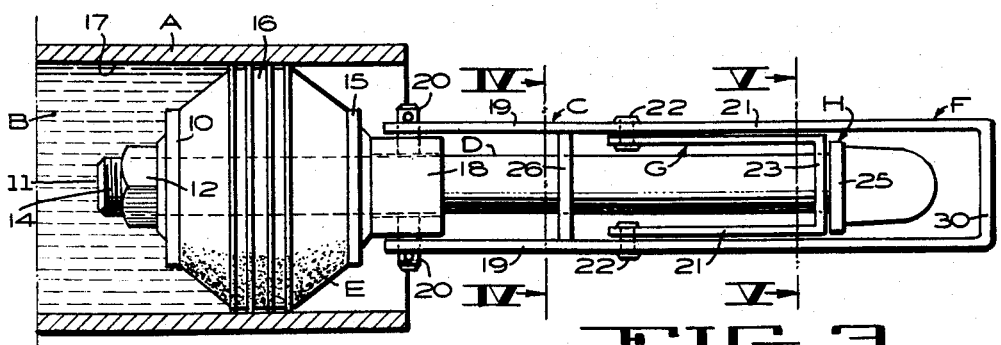
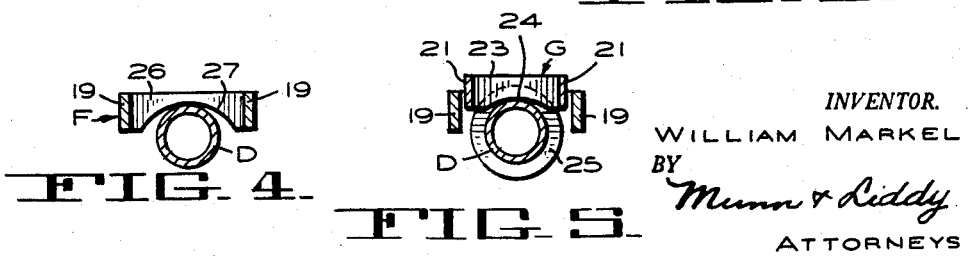
INVENTOR.
WILLIAM MARKEL
BY
Munn & Liddy
ATTORNEYS

2,924,246

TOGGLE-OPERATED TEST PLUG FOR PLUMBING UNITS

William Markel, Sacramento, Calif.

Application February 10, 1958, Serial No. 714,179

2 Claims. (Cl. 138—89)

The present invention relates to improvements in a toggle-operated test plug for plumbing units. It consists of the combinations, constructions and arrangements of parts, as hereinafter described and claimed.

At the present time, it is the customary practice to insert a test plug in the lower portion of a pipe to form a closure therein, this pipe having various other pipes leading thereto, such as from wash basins, tubs, flush toilets, etc. Thereafter, the pipes are filled with water in order to test the different joints to determine that they have been properly installed. Such a test plug includes a resilient spool that is expanded by means of a wing nut in an attempt to expand the spool against the wall of the pipe into which it is inserted. However, the plumber does not always expand the spool sufficiently, since it is concealed in the pipe and the threads may be damaged, preventing the proper expanding of the spool. As a result, the test plug often becomes dislodged by the head of the water.

As the cardinal object of the present invention, it is proposed to provide a test plug of the character described, which includes a toggle arrangement for expanding the resilient rubber spool so that the plumber will have complete assurance that the spool will be expanded the proper amount for the size of the pipe involved. The toggle includes a swingable lever handle; and, when this handle is actuated in one direction so as to move the toggle into a self-locking position, the rubber spool will be expanded to the proper size to effect a complete closure in the pipe. Upon moving the lever handle in the opposite direction, the toggle is automatically unlocked and the spool is permitted to contract, thus allowing the test plug to be removed from the pipe.

Another object of my invention is to provide a test plug that may be readily installed in a pipe or removed therefrom, the test plug being simple in construction, durable and efficient for the purpose intended.

Other objects and advantages will appear as the specification continues. The novel features will be particularly pointed out in the appended claims.

Drawings

For a better understanding of my invention, reference should be made to the accompanying drawing, forming part of this specification, in which:

Figure 1 is a longitudinal vertical sectional view taken through a pipe, and showing my test plug being installed therein, the toggle arrangement being shown in unlocked position;

Figure 2 is a view similar to Figure 1, but disclosing the toggle arrangement in locked position and with the rubber spool providing a sealed closure in the pipe;

Figure 3 is a top plan view of Figure 2; and

Figures 4 and 5 are transverse sectional views taken along the lines IV—IV and V—V, respectively, of Figure 3; and Figure 6 shows a modified form of part of the test plug.

While I have shown only the preferred forms of my invention, it should be understood that various changes, or modifications, may be made within the scope of the annexed claims without departing from the spirit thereof.

Detailed description

In carrying out my invention, I have shown a pipe indicated generally at A. It will be understood that various pipes (not shown) lead to this pipe from basins, tubs, flush toilets, etc. It is desired that a head of water B be established in this pipe and all pipes leading thereto so that the different joints may be tested for leakage. Thereafter, the pipe A may be connected to the sewer line in the usual manner.

My toggle-operated test plug is designated generally at C; it includes a pipe D having a front plate 10 secured to a forward end 11 of this pipe to extend transversely thereof. For this purpose, I have shown a nut 12 which is welded to the plate 10, or otherwise fixed thereto, the nut being threaded onto the threads 14 at the forward end 11 of the pipe. Moreover, a thrust plate 15 is slidably disposed on the pipe D in spaced relation with the front plate 10 and rearwardly of the latter. The thrust plate 15 also extends transversely of the pipe D.

It will be noted that a resilient rubber spool E is slidably disposed on the pipe D and is interposed between the plates 10 and 15. This spool has an enlarged central portion 16 that is adapted to telescope into the bore 17 of the pipe A, when the spool occupies its normal uncompressed condition as shown in Figure 1. However, this spool may be readily expanded outwardly by drawing the plates 10 and 15 toward one another, and this will provide a complete closure across the interior of the pipe A as illustrated in Figures 2 and 3 of the drawing.

The thrust plate 15 is provided with a sleeve 18 which is fixed thereto, this sleeve being slidably disposed on the pipe D for back and forth movement with the thrust plate moving therewith. The toggle-operated test plug C further includes a lever handle F that is substantially U-shaped in top plan view, as disclosed in Figure 3. This handle defines a pair of side straps 19, the forward ends of which straddle the sleeve 18. The latter is provided with a pair of trunnions 20 to which the forward ends of the straps 19 are anchored. Thus the lever handle F is swingably secured to the sleeve 18, with the handle extending rearwardly from the thrust plate 15.

In its further structural details, the test plug C includes a pressure arm G, which is substantially U-shaped, defining a pair of side straps 21. The latter have their forward ends swingably secured by journal pins 22 to intermediate portions of the side straps 19 of the lever handle F, with the pressure arm G extending in a rearward direction. The pressure arm has a transverse portion 23 at its free end that is adapted to engage with an abutment H provided on the pipe D. As shown in the drawing, this abutment takes the form of an elbow that is threaded on the right hand end of the pipe D. The transverse portion 23 is fashioned with a saddle 24 on its underneath surface (see Figure 5), and this saddle is adapted to rest upon the pipe D in front of a flange 25 provided on the abutment H.

It will be observed that the lever handle F and the pressure arm G constitute a toggle arrangement, which is operable for drawing the plates 10 and 15 toward one another to thereby expand the rubber spool E outwardly, as shown in Figure 2, when the transverse portion 23 of pressure arm G rests against the abutment H and the lever handle F is swung toward the pipe D. The lever handle F is provided with a brace 26 that extends between and is secured to the side straps 19 of the lever handle. This brace extends transversely across the pipe D to constitute a stop that is positioned to contact with the pipe D, when the toggle is moved into a self-locking position, as shown in Figure 2. The underneath side of the brace 26 is formed with a saddle 27 which is adapted to abut the pipe D when the toggle is locked.

Referring to Figure 2, the journal pins 22 have been shown as being disposed below a dot-dash line 28. This line extends between the journal pins 20 and the point 29 where the pressure arm portion 23 contacts with the abutment H. At this time, the saddle 27 of the brace 26 rests against the pipe D and the toggle is locked. It will be quite apparent that when the free end 30 of the lever handle F is raised, the toggle will be unlocked; and the tendency of the rubber spool E, due to its resilient characteristic to return to normal position (as disclosed in Figure 1) will urge the plates 10 and 15 apart. This will free the spool E from engagement with the bore 17 of the pipe A and the test plug C may be withdrawn.

When the toggle is locked, as in Figures 2 and 3, the lever handle F and the pressure arm G are disposed substantially parallel to the pipe D, producing a compact unit. At this time, the free end 30 of the lever handle F projects only a short distance rearwardly beyond the abutment H, thus reducing the over-all length of the unit. Moreover, the lever handle F is made to be arranged parallel with the pipe D, when the pressure arm G is disengaged from the abutment H to thus provide a compact unit, with the resilient rubber spool E being relaxed.

For the purpose of introducing the water B into the pipe A and the pipes connected thereto, a cap 31 on the elbow H may be removed, and a hose (not shown) connected to the threads 32 on the elbow. Thus the water will be conveyed through the pipe D and discharged through the forward end 11 of the pipe D into the pipe A in front of the rubber spool E. In a like manner, the water B may be withdrawn through the pipe D and the elbow H by removing the cap 31 after the test has been completed.

When testing pipes A of different sizes, it is merely necessary to use rubber spools E of the proper sizes. Obviously, the nut 12 and its integral front plate 10 may be removed from the forward end 11 of the pipe D, when changing the rubber spools. The fact that the nut 12 and the abutment elbow H are threaded onto the pipe D will allow the test plug C to be adjusted so that the rubber spool will be forced against the bore 17 of the pipe A with the proper amount of pressure, when the toggle is moved into a self-locking position (see Figure 2).

In Figure 6, the pipe D has been shown as being provided with a T H', which takes the place of the elbow H in Figures 1 and 2. This T may be provided with a riser pipe 33 of suitable height so that water may be introduced thereinto so as to establish a head of water B in the pipe A and the pipes connected thereto. This will allow the various joints of the plumbing unit to be tested. A removable plug 31' is provided in the lower end of the T H' to allow the water to be drained through the pipe D and the water in the riser pipe 33 may be drained in a like manner. Of course, the rubber spool E, the lever handle F and the pressure arm G would be provided on the pipe D in Figure 6, and operated in the same manner as already described.

I claim:

1. In a toggle-operated test plug for plumbing units: a pipe having a front plate secured to a forward end of the pipe to extend transversely thereof; a thrust plate slidably disposed on the pipe in spaced relation with the front plate and rearwardly of the latter; the thrust plate extending transversely of the pipe; a resilient rubber spool slidably disposed on the pipe and being interposed between the two plates; the thrust plate being provided with a sleeve thereon which is slidably disposed on the pipe; a lever handle having one end swingably secured to the sleeve and the lever handle extending rearwardly from the thrust plate; a pressure arm having one end thereof swingably attached to an intermediate portion of the lever handle, with the pressure arm projecting in a rearward direction; the pressure arm having a free end adapted to engage with an abutment provided on the pipe; the lever handle and the pressure arm constituting a toggle, which is operable for drawing the two plates toward one another to thereby expand the rubber spool outwardly when the free end of the pressure arm is engaged with the abutment and the lever handle is swung toward the pipe; the toggle provided by the lever handle and the pressure arm being movable into a self-locking position, when the lever handle is swung into substantially parallel relation with the pipe, thus producing a compact unit, and the lever handle having a free end projecting only a short distance rearwardly beyond the abutment at this time to reduce the over-all length of the unit; the free end of the pressure arm being swingable away from the pipe into an inactive position wherein said free end of the pressure arm is disengaged from the abutment; the lever handle being movable into substantially parallel relation with the pipe, when the pressure arm is disposed in said inactive position to thus provide a compact unit, at which time the resilient rubber spool is relaxed; the pressure arm having a transverse portion at its free end that is fashioned with a saddle adapted to removably rest against the pipe, when the pressure arm is arranged against the abutment on the pipe; the saddle being concaved so as to restrain the pressure arm from slipping laterally relative to the pipe, as the toggle is moved into self-locking position.

2. In a toggle-operated test plug for plumbing units: a pipe having a front plate secured to a forward end of the pipe to extend transversely thereof; a thrust plate slidably disposed on the pipe in spaced relation with the front plate and rearwardly of the latter; the thrust plate extending transversely of the pipe; a resilient rubber spool slidably disposed on the pipe and being interposed between the two plates; the thrust plate being provided with a sleeve fixed thereto, the sleeve being slidable on the pipe; a substantially U-shaped lever handle defining a pair of side straps; the forward ends of these side straps straddling the sleeve and being swingably secured to the sleeve, with the lever handle extending rearwardly from the thrust plate; a substantially U-shaped pressure arm also having a pair of side straps; the side straps of the pressure arm having their forward ends swingably secured to intermediate portions of the side straps of the lever handle, with the pressure arm projecting in a rearward direction; the pressure arm having a transverse portion at its free end that is adapted to removably engage with an abutment provided on the pipe, and this transverse portion being fashioned with a saddle adapted to rest against the pipe; the lever handle and the pressure arm constituting a toggle, which is operable for drawing the two plates toward one another to thereby expand the rubber spool outwardly, when the transverse portion of the pressure arm rests against the abutment and the lever handle is swung toward the pipe; the toggle being movable into a self-locking position; the lever handle being provided with a brace that extends between and is secured to the side straps of the lever handle to reinforce the latter; this brace extending transversely across the pipe and being formed with a saddle on its underneath side that is positioned to contact with the pipe to constitute a stop for the lever handle, when the toggle is moved into a self-locking position; the saddle on the transverse portion of the pressure arm being spaced from the saddle on the brace, whereby the two saddles will contact with the pipe at spaced points along the length of the pipe; both saddles being concaved so as to embrace the pipe and restrain the lever handle and the pressure arm from slipping laterally relative to the pipe as the toggle approaches a self-locking position.

References Cited in the file of this patent

UNITED STATES PATENTS

| | | |
|---|---|---|
| 995,987 | Rich | June 20, 1911 |
| 2,574,281 | Olson | Nov. 6, 1951 |
| 2,607,370 | Anderson | Aug. 19, 1952 |